US010703120B2

(12) United States Patent
Suzuki et al.

(10) Patent No.: US 10,703,120 B2
(45) Date of Patent: Jul. 7, 2020

(54) INFORMATION PROCESSING DEVICE

(71) Applicant: FUJI XEROX CO., LTD., Tokyo (JP)

(72) Inventors: Shiro Suzuki, Yokohama (JP); Ryo Miyano, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/283,987

(22) Filed: Feb. 25, 2019

(65) Prior Publication Data

US 2019/0184721 A1 Jun. 20, 2019

Related U.S. Application Data

(63) Continuation of application No. 15/576,250, filed as application No. PCT/JP2016/065783 on May 27, 2016, now Pat. No. 10,357,983.

(30) Foreign Application Priority Data

May 28, 2015 (JP) ................................ 2015-108810

(51) Int. Cl.

| | |
|---|---|
| ***B41J 29/00*** | (2006.01) |
| ***G06K 7/10*** | (2006.01) |
| ***G03G 15/00*** | (2006.01) |
| ***G03G 21/00*** | (2006.01) |
| ***G04G 17/08*** | (2006.01) |

(52) U.S. Cl.

CPC .......... *B41J 29/00* (2013.01); *G03G 15/5016* (2013.01); *G03G 21/00* (2013.01); *G04G 17/08* (2013.01); *G06K 7/10316* (2013.01)

(58) Field of Classification Search

None

See application file for complete search history.

(56) References Cited

U.S. PATENT DOCUMENTS

| | | | |
|---|---|---|---|
| 2012/0014278 | A1 | 1/2012 | Ameti et al. |
| 2012/0014484 | A1 | 1/2012 | Ameti et al. |
| 2013/0155450 | A1 | 6/2013 | Higashikawa |
| 2013/0286433 | A1 | 10/2013 | Matsushima et al. |
| 2014/0168681 | A1 | 6/2014 | Nakamura |
| 2014/0285310 | A1 | 9/2014 | Ito et al. |
| 2015/0280306 | A1 | 10/2015 | Asai |
| 2015/0319718 | A1 | 11/2015 | Yang et al. |
| 2015/0334762 | A1 | 11/2015 | Yang et al. |
| 2017/0064111 | A1 | 3/2017 | Matsushima et al. |
| 2017/0318485 | A1 | 11/2017 | Xing |
| 2018/0015755 | A1 | 1/2018 | Yamada |

FOREIGN PATENT DOCUMENTS

| | | |
|---|---|---|
| CN | 103158354 A | 6/2013 |
| CN | 103229070 A | 7/2013 |
| CN | 104507116 A | 4/2015 |

(Continued)

*Primary Examiner* — Howard Williams

(74) *Attorney, Agent, or Firm* — Oliff PLC

(57) ABSTRACT

An information processing device includes: an apparatus main body; and a display mechanism that is provided to be displaceable with respect to the apparatus main body, is provided with an antenna used to perform communication with a mobile terminal, and is configured to display information. The apparatus main body is not located in a place where the display mechanism extends upwards and downwards the display mechanism in a state in which the display mechanism is displaced with respect to the apparatus main body.

5 Claims, 5 Drawing Sheets

110 211 1 220 230 214 241 242 242B 242A 1A 213 221 100E 100X 100 1C 1B 100B 100A 244 200 212 240 120 NFC

(56) References Cited

FOREIGN PATENT DOCUMENTS

| | | | |
|---|---|---|---|
| CN | 104904150 | A | 9/2015 |
| JP | 2010-271671 | A | 12/2010 |
| JP | 2011-091744 | A | 5/2011 |
| JP | 2013-147015 | A | 8/2013 |
| JP | 2013-228540 | A | 11/2013 |
| JP | 2014-209303 | A | 11/2014 |

1
110
211
220
221
230
214
241
242
242B
242A
NFC
240
212
120
200
244
100A
1A
213
100E
100X
100
1C
1B
100B

INFORMATION PROCESSING DEVICE

INFORMATION PROCESSING DEVICE

This application is a continuation of U.S. application Ser. No. 15/576,250, filed Nov. 21, 2017, which is a national stage entry of PCT/JP2016/065783, filed May 27, 2016, which is based on and claims priority to Japanese Patent Application JP 2015-108810 filed May 28, 2015. The content of each of the above references is hereby incorporated by reference in its entirety.

TECHNICAL FIELD

The present invention relates to an image forming apparatus.

BACKGROUND ART

PTL 1 discloses an image forming apparatus provided with a communication section corresponding to an antenna section of housing in a location which can be viewed from above.

PRIOR ART LITERATURE

Patent Literature

[PTL 1] JP-A-2013-228540

SUMMARY OF INVENTION

Technical Problem

In a case where an antenna that performs communication with a mobile terminal is installed in an image forming apparatus and the mobile terminal is held over the antenna, communication is performed between the image forming apparatus and the mobile terminal.

However, in a case where a display mechanism provided in the image forming apparatus is configured to be displaceable and the user holds the mobile terminal over the antenna, interferences are caused between the mobile terminal and the display mechanism in a displaced state, and thus there is a problem in that it is difficult to perform an operation of holding the mobile terminal over the antenna.

In an embodiment of the present invention, it is possible to improve operability in a case where the mobile terminal is held over the antenna installed in the image forming apparatus which includes the displaceable display mechanism.

Solution to Problem

[1] According to at least one embodiment of the present invention, there is provided an image forming apparatus including: an apparatus main body; and a display mechanism that is provided to be displaceable with respect to the apparatus main body, is provided with an antenna used to perform communication with a mobile terminal, and is configured to display information.

[2] In the image forming apparatus of [1], the display mechanism may include a display screen, and is capable of taking at least two states including a first state in which the display screen is close to a side of a front surface of the apparatus main body, and a second state in which the display screen is separated from the side of the front surface, and the antenna may approach the side of the front surface of the apparatus main body in a case where the display mechanism is displaced from the second state to the first state.

[3] In the image forming apparatus of [1] or [2], the display mechanism may be displaced with respect to the apparatus main body by rotating around a rotational shaft, and, furthermore, may include a side edge along a direction in which the rotational shaft extends, and the antenna may be installed between the rotational shaft and the side edge, and may be installed on a side which is closer to the rotational shaft than the side edge.

[4] In the image forming apparatus of any one of [1] to [3], the apparatus main body may be further provided with a control section that controls the image forming apparatus, the display mechanism may be provided with a control substrate that controls display performed on the display mechanism, a connection line that electrically connects the control section to the control substrate may be provided, and the antenna may be connected to the control substrate, and is connected to the control section through the connection line.

[5] The image forming apparatus of any one of [1] to [4] may be composed such that it is possible to install another antenna in a predetermined installation place of the apparatus main body, and the antenna provided in the display mechanism may be provided on a side opposite to a side which is close to the predetermined installation place.

[6] The image forming apparatus of [2] may be composed such that it is possible to install another antenna, which is different from the display mechanism-side antenna that is the antenna provided in the display mechanism, in the apparatus main body, and may further include guidance means that may perform guidance, which indicates that a place over which the mobile terminal is held corresponds to another antenna, may be performed with respect to a user in a case where another antenna is installed in the apparatus main body and the display mechanism is in the second state, and may perform guidance, which indicates that the place over which the mobile terminal is held corresponds to the display mechanism-side antenna, with respect to the user in a case where another antenna is installed in the apparatus main body and the display mechanism is in a state other than the second state.

Advantageous Effects of Invention

According to the image forming apparatus of [1], compared to a case where the antenna is installed on a side of the apparatus main body, it is possible to improve operability in a case where the mobile terminal is held over the antenna installed in the image forming apparatus which includes the displaceable display mechanism.

According to the image forming apparatus of [2], compared to a case where the antenna does not approach the side of the front surface of the apparatus main body, it is possible to improve operability in a case where the mobile terminal is held over the antenna.

According to the image forming apparatus of [3], compared to a case where the antenna is installed on a side close to the side edge between the rotational shaft and the side edge, unintended displacement of the display mechanism is hardly caused.

According to the image forming apparatus of [4], compared to a case where a dedicated connection line, which connects the control section to the antenna, is provided, a configuration of the device becomes simple.

According to the image forming apparatus of [5], compared to a case where the antenna provided in the display mechanism is disposed on a side which is close to another antenna installation place, it is possible to prevent communication from being performed between an antenna, which is not scheduled to be communicated, and the mobile terminal.

According to the image forming apparatus of [6], it is possible to install an antenna, which has a function different from that of the antenna provided in the display mechanism, in the image forming apparatus, and, in addition, it is possible to improve operability in a case where the mobile terminal is held over the antenna.

DESCRIPTION OF EMBODIMENTS

Hereinafter, embodiments of the present invention will be described in detail with reference to the accompanying drawings.

Figure 1:
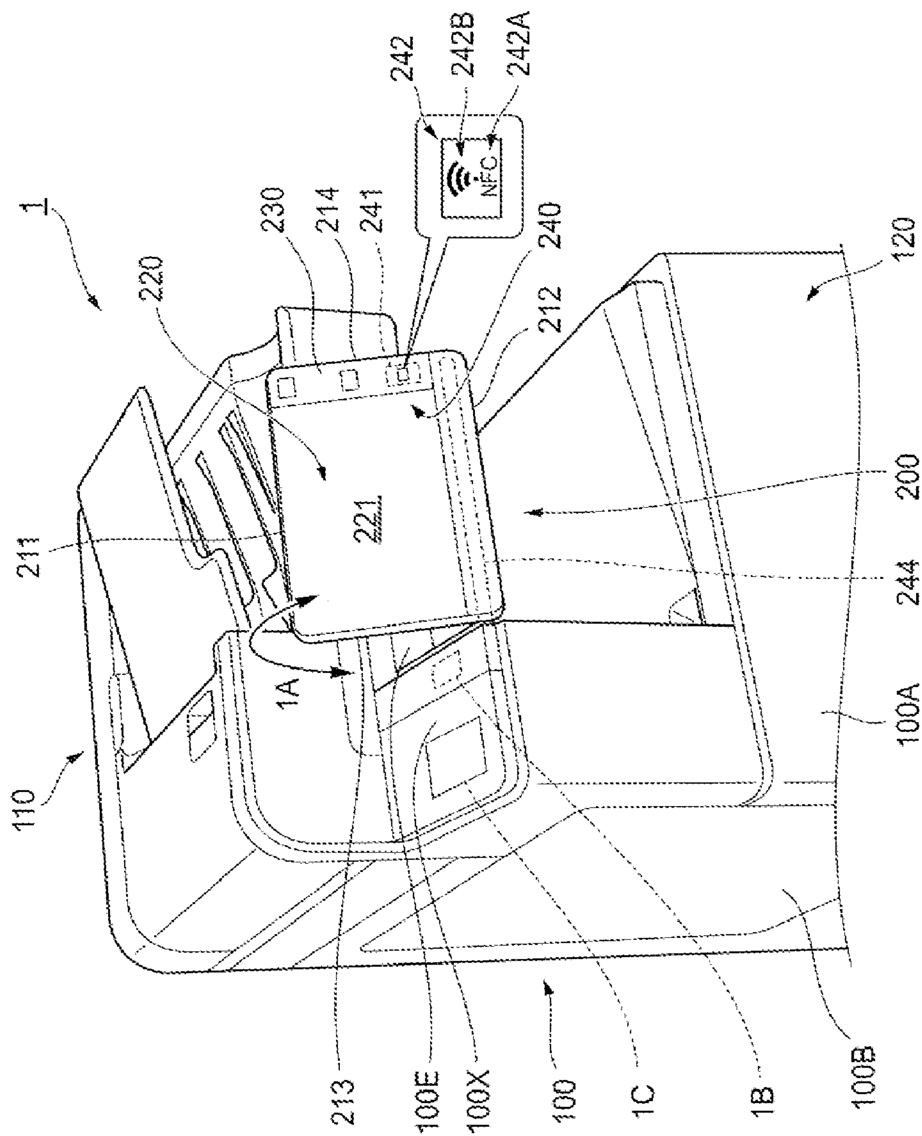
FIG. 1 is a diagram illustrating an image forming apparatus according to an embodiment.

FIG. 1 is a diagram illustrating an image forming apparatus 1 according to the embodiment.

The image forming apparatus 1 according to the embodiment is provided with an apparatus main body 100, and a display mechanism 200 that is provided to be displaceable with respect to the apparatus main body 100.

The apparatus main body 100 is provided with an image reading mechanism 110 that reads an image on an original document, and an image forming mechanism 120 that performs image-forming on paper which is an example of a recording material.

In addition, the apparatus main body 100 includes a front surface 100A which faces a user in a case where the user operates the image forming apparatus 1. In addition, the apparatus main body 100 includes a rear surface (not illustrated in the drawing) that is positioned on a side opposite to the front surface 100A, and a left-side surface 100B and a right-side surface (not illustrated in the drawing) which connect the front surface 100A to the rear surface.

The image forming mechanism 120 performs image-forming on the paper using a so-called electrophotographic system. Meanwhile, an image-forming method is not limited to the electrophotographic system, and another method, such as an ink jet method, may be used.

The display mechanism 200 is provided with a display panel 220 which is composed of a liquid crystal panel or the like. The display panel 220 includes a display screen 221, and displays information using the display screen 221. Furthermore, the display mechanism 200 is provided with a control substrate (which will be described later) which is used to control display on the display panel 220.

In addition, the display mechanism 200 is formed in a plate shape, and has four side edges including a first side edge 211 to a fourth side edge 214.

Here, the first side edge 211 is located at an upper end of the display mechanism 200 in a state in which the display mechanism 200 is upright (standing state), as illustrated in FIG. 1. In addition, the first side edge 211 is disposed along a horizontal direction.

In addition, the second side edge 212 is located at a lower end of the display mechanism 200 in a state in which the display mechanism 200 is upright, and, in addition, extends along the horizontal direction.

Furthermore, the third side edge 213 is located at a left end of the display mechanism 200 in the drawing, and extends along a vertical direction. In addition, the fourth side edge 214 is located at a right end of the display mechanism 200 in the drawing and extends along the vertical direction.

Furthermore, in the embodiment, an exterior cover 230, which is composed of a black resin material and is formed in a plate shape, is provided on a right side of the display panel 220 in the drawing.

Furthermore, in the embodiment, a communication section 240, which performs communication (Near Field Communication (NFC)) with a mobile terminal possessed by the user, is provided.

Meanwhile, in the embodiment, not only information is transmitted from the communication section 240 but also information stored in the communication section 240 is rewritten. In other words, the communication section 240 is composed of an active tag which has a reading/writing function.

The communication section 240 is provided with an antenna 241. Furthermore, the communication section 240 is provided with an IC chip (not illustrated in the drawing) or the like in order to store information.

Furthermore, the communication section 240 is provided with a display lamp 242 (display lamp 242 that notifies the user of a place over which the mobile terminal is held) that indicates the place over which the mobile terminal is held.

The antenna 241, the IC chip, and the like are provided on a back side of the exterior cover 230. In the embodiment, communication (Near Field Communication (NFC)) is performed between the image forming apparatus 1 and the mobile terminal possessed by the user through the antenna 241. Therefore, for example, the image forming apparatus 1 and the mobile terminal are paired. In addition, for example, information is transmitted from the mobile terminal to the image forming apparatus 1, and the information is transmitted from the image forming apparatus 1 to the mobile terminal.

Meanwhile, a smart phone and a tablet terminal are examples of the mobile terminal.

In addition, in the embodiment, a rotational shaft 244, which extends along the first side edge 211 and the second side edge 212 of the display mechanism 200, is provided. The display mechanism 200 rotates around the rotational shaft 244, and is displaced with respect to apparatus main body 100.

Here, the antenna 241 is provided between the rotational shaft 244 and the first side edge 211, and is installed on a side which is close to the rotational shaft 244 between the rotational shaft 244 and the first side edge 211.

In a case where communication is performed between the image forming apparatus 1 and the mobile terminal, the mobile terminal is held over the antenna 241 of the display mechanism 200.

Here, there is a case where the mobile terminal is pressed against the display mechanism 200. Here, in a case where the antenna 241 is installed on a side which is close to the rotational shaft 244, it is easy that rotation moment, which applies to the display mechanism 200, is reduced, compared to a case where the antenna 241 is installed on a side which is close to the first side edge 211. Furthermore, in this case, unintended rotation of the display mechanism 200 is prevented. That is, the display mechanism 200 in the standing state is prevented from being laid.

Meanwhile, FIG. 1 illustrates a first state in which the display mechanism 200 is displaced with respect to the apparatus main body 100 and the display screen 221 is close to a side of the front surface 100A of the apparatus main body 100.

In a case where the display mechanism 200 is pressed toward to a side of the rear surface of the apparatus main body 100 from the first state, the display mechanism 200 rotates in a direction indicated by reference symbol 1A, and a second state, in which the display screen 221 is separated from the side of the front surface 100A, (second state in which the display mechanism 200 is laid) is made.

A recess section 100E is provided in the apparatus main body 100, and, in the second state, the display mechanism 200 is accommodated in the recess section 100E.

Furthermore, in the second state, an exterior surface 100X of the apparatus main body 100 and an exterior surface (display screen 221) of the display mechanism 200 are aligned. That is, the exterior surface 100X of the apparatus main body 100 and the exterior surface of the display mechanism 200 are located on the same surface.

However, although an aspect in which the antenna 241 is provided on a side of the apparatus main body 100 is conceivable, in this case, there is a problem in that operability is lowered in a case where the mobile terminal is held over the antenna 241 (in a case where the mobile terminal faces the antenna 241).

Specifically, for example, a case where the antenna is installed in a place indicated by reference symbol 1B in the drawing is assumed. In this case, for example, in a case where a largish mobile terminal, such as a mobile terminal of an A4 size, is held over the antenna, interferences are caused between the mobile terminal and the display mechanism 200 in the standing state, and thus it is difficult to perform an operation of holding the mobile terminal over the antenna.

Compared to this, in a case where the antenna 241 is provided in the display mechanism 200 similar to the embodiment, interferences between the mobile terminal and the display mechanism 200 are avoided.

That is, in the embodiment, in a case where the display mechanism 200 is displaced from the second state in which the display mechanism 200 is laid to the first state in which the display mechanism 200 is standing, the antenna 241 becomes close to the side of the front surface 100A of the apparatus main body 100. Therefore, a state in which the antenna 241 is installed in the innermost place is avoided, and thus it is easy for the user to perform the operation of holding the mobile terminal over the antenna 241.

Figure 2:
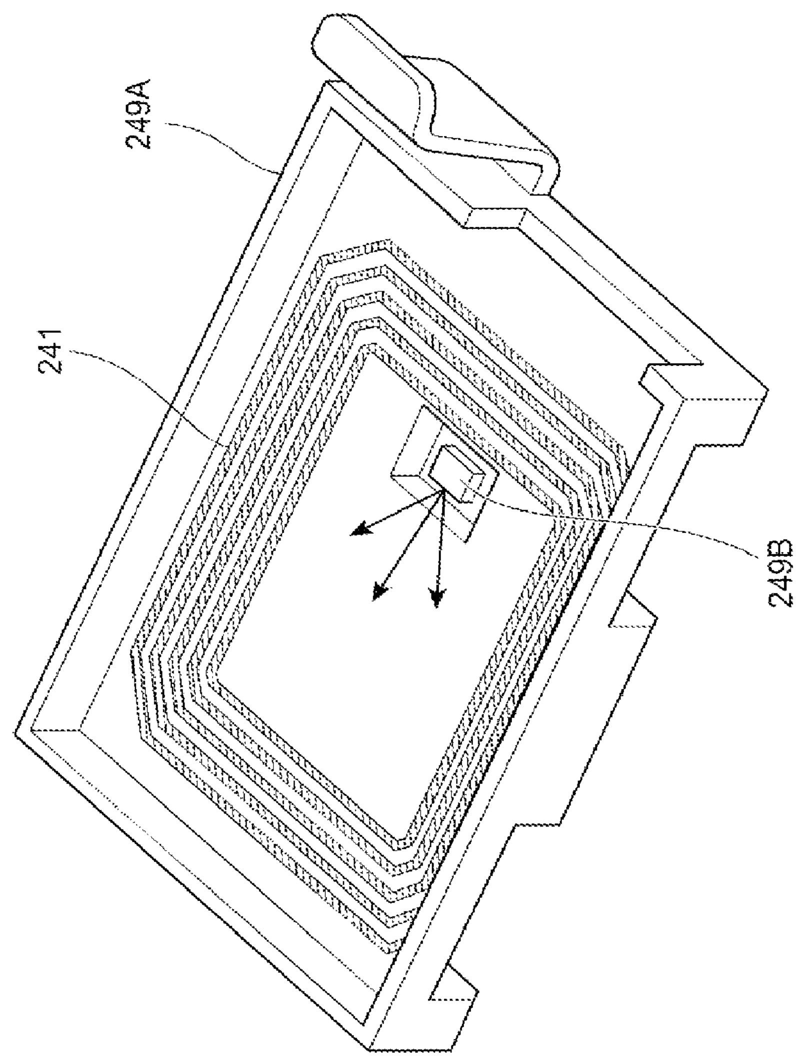
FIG. 2 is a diagram illustrating an antenna.

FIG. 2 is a diagram illustrating the antenna 241.

The antenna 241 and an accommodation member 249A that accommodates the antenna 241 are provided on the back side of the exterior cover 230 (see FIG. 1) of the display mechanism 200, as illustrated in FIG. 2.

The accommodation member 249A is formed in a plate parallelepiped shape. Furthermore, a light source 249B that is composed of a Light Emitting Diode (LED) is installed on an inner side of a region surrounded by the antenna 241.

In a case where the display lamp 242 (see FIG. 1) is irradiated with light emitted from the light source 249B, the display lamp 242 is lighted. Therefore, it is easy for the user to recognize a place over which the mobile terminal is held.

Figure 3:
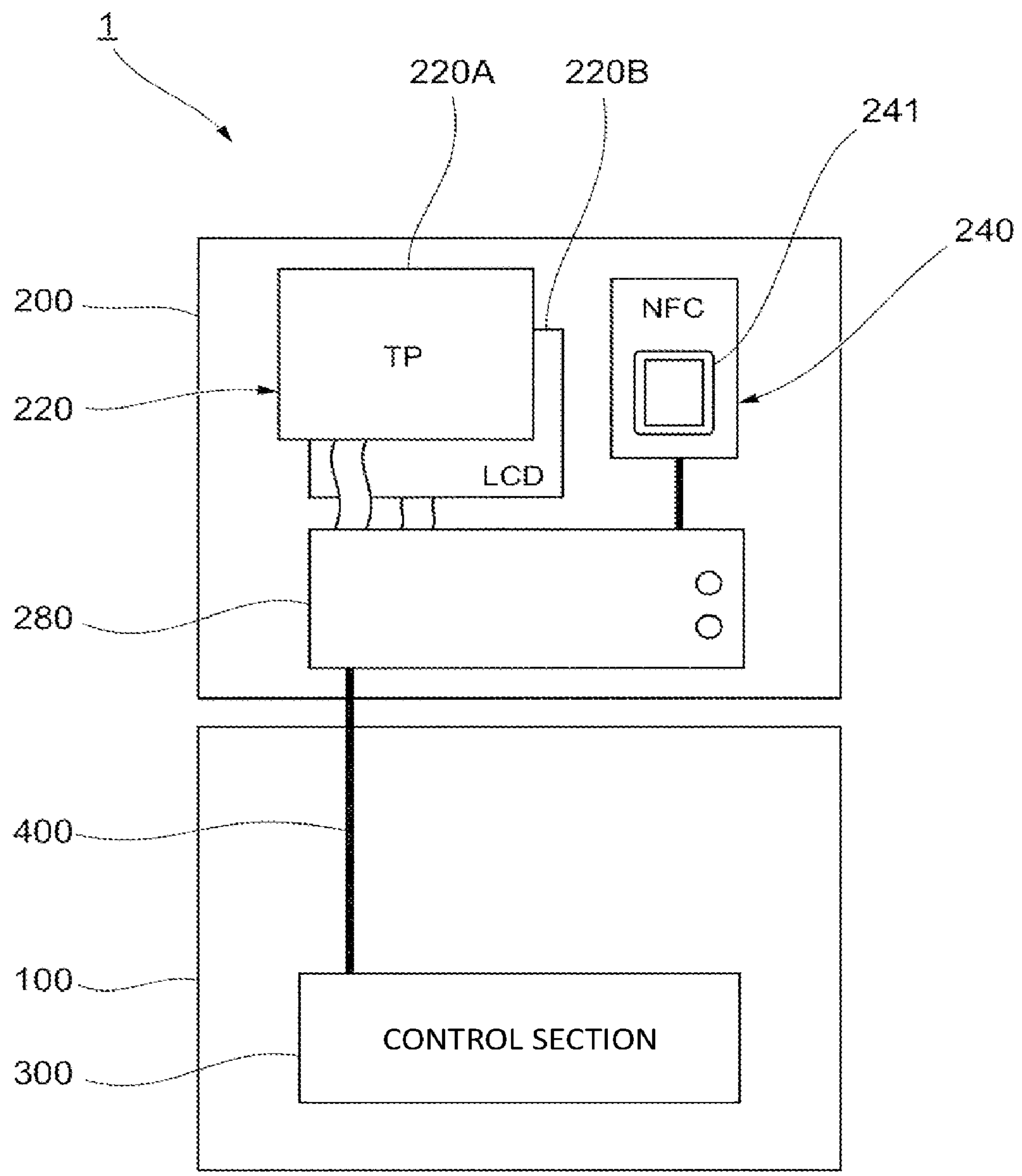
FIG. 3 is a diagram illustrating wirings and a substrate, which are provided in the image forming apparatus.

FIG. 3 is a diagram illustrating wirings and a substrate which are provided in the image forming apparatus 1.

The display panel 220 is provided on a side of the display mechanism 200 of the image forming apparatus 1, as illustrated in FIG. 3. The display panel 220 according to the embodiment is composed of a touch panel 220A and a liquid crystal display 220B.

Furthermore, a control substrate 280, which performs display control on the liquid crystal display 220B and reception of a signal from the touch panel 220A, is provided on the side of the display mechanism 200. Furthermore, the communication section 240, which includes the antenna 241, is provided in the display mechanism 200.

In contrast, a control section 300, which controls respective sections of the image forming apparatus 1, is provided on the side of the apparatus main body 100. Furthermore, in the embodiment, a connection line 400, which electrically connects the control section 300 provided on the side of the apparatus main body 100 to the control substrate 280 provided in the display mechanism 200, is provided.

The antenna 241 provided in the display mechanism 200 is once connected to the control substrate 280, and is connected to the control section 300 through the connection line 400. Therefore, the configuration of the device becomes simple.

Here, although an aspect in which the antenna 241 is connected to the control section 300 using a dedicated connection line is conceivable, in this case, it is necessary to prepare the dedicated connection line, thereby causing increase in manufacturing cost. In addition, in a case where the dedicated line is provided, the configuration of the device becomes complicated, compared to a case where the dedicated line is not provided.

In contrast, in the embodiment, the antenna 241 is connected to the control substrate 280, and thus the configuration of the device becomes simple. In addition, the dedicated line is not provided, and thus the manufacturing cost becomes further low.

However, in the recent years, an IC card reader, which is capable of performing communication with the mobile terminal (performing communication with the mobile terminal through NFC), has been developed. In the image forming apparatus 1 according to the embodiment, the IC card reader is retrofitted in a place indicated by reference symbol 1C in FIG. 1, and thus it is possible to install the IC card reader which performs communication with the mobile terminal. Meanwhile, in the IC card reader, which is retrofitted and installed, a display lamp, which is the same as the display lamp 242 illustrated in FIG. 1, is provided.

Here, control, which is performed by the image forming apparatus 1 in a case where the IC card reader is installed in the image forming apparatus 1, will be described.

In a case where the IC card reader is installed in the image forming apparatus 1, control of lighting of the display lamp is differentiated according to a state of the display mechanism 200.

Specifically, in a case where the display mechanism 200 is in the second state (the state in which the display mechanism 200 is laid), the display lamp provided in the IC card reader is lighted, and thus guidance, which indicates that the place over which the mobile terminal is held corresponds to the IC card reader, is performed with respect to the user.

That is, in a case where the display mechanism 200 is in the second state (the state in which the display mechanism 200 is laid), the display lamp 242 (see FIG. 1) of the display mechanism 200 is lighted. In addition, the display lamp provided in the IC card reader is lighted, and thus guidance, which indicates that the place over which the mobile terminal is held corresponds to the IC card reader, is performed with respect to the user.

In contrast, in a case where the display mechanism 200 is in the first state (the state in which the display mechanism 200 is standing, that is, states other than the second state), the display lamp provided in the IC card reader is lighted. In addition, the display lamp 242 of the display mechanism 200 is lighted, and thus guidance, which indicates that the place over which the mobile terminal is held corresponds to the antenna 241 of the display mechanism 200, is performed with respect to the user.

Meanwhile, the guidance is performed by the control section 300 (see FIG. 3) which functions as guidance means. Here, the control section 300 is composed of a Central Processing Unit (CPU) on which program control is performed.

In addition, whether the display mechanism 200 is in the first state or the second state is determined by, for example, a switch (not illustrated in the drawing) which is turned on/off by being pressed by the display mechanism 200.

Here, in the process example, in a case where the display mechanism 200 is in the first state (standing state), the place over which the mobile terminal is held becomes the antenna 241 of the display mechanism 200. Therefore, as described above, the interferences between the display mechanism 200 and the mobile terminal are avoided, and thus it is easy to hold the mobile terminal over the antenna 241.

In addition, in a case where the display mechanism 200 is in the second state (laid state), the place over which the mobile terminal is held becomes the IC card reader, and thus reading of information from the IC card (not illustrated in the drawing) is performed in addition to communication between the mobile terminal and the image forming apparatus 1.

Meanwhile, the display mechanism 200 and the display lamp 242, which is provided in the IC card reader, are formed to have a dark transparent plate disposed at a part of a black board (a base material).

Specifically, in the display lamp 242 according to the embodiment, parts corresponding to a character 242A which includes "NFC" and a mark 242B which indicates radio wave transmission are formed by the dark transparent plate, the parts being illustrated in FIG. 1. Ground parts corresponding to other parts are composed of a black board (opaque board).

In a case where the display lamp 242 is irradiated with light from the light source 249B (see FIG. 2), the character 242A and the mark 242B emerge.

In contrast, in a state in which the display lamp 242 is not irradiated with light, a state in which a contrast between the transparent plate and the black board is small is made, thereby causing a state in which the character 242A and the mark 242B become invisible (a state in which the user does not notice).

As a result, in the embodiment, only the display lamp on a side which is irradiated with light becomes conspicuous, and the display lamp which is not irradiated with light is not noticed by the user.

In the embodiment, as described above, any one of the display lamp 242 on the side of the display mechanism 200 and the display lamp (the display lamp of the IC card reader) on the side of the apparatus main body is lighted. However, in this case, it is difficult for a remaining one to be conspicuous.

Therefore, a case where the user is in doubt about one of the two display lamps to which the mobile terminal is held over seldom occurs.

Here, in the embodiment, in a case where the IC card reader (another antenna) is retrofitted and is installed, the IC card reader is installed in a predetermined installation place (place indicated by reference symbol 1C in FIG. 1).

Meanwhile, the antenna on the side of the display mechanism 200 is provided on a side opposite to a side which is close to the predetermined installation place. That is, in the embodiment, the IC card reader is installed on a left side of the display mechanism 200 in the drawing, and thus the antenna 241 provided in the display mechanism 200 is disposed on a right side of the display mechanism 200.

Here, in a case where the antenna 241 of the display mechanism 200 is installed on a side which is close to the IC card reader, an alienation distance between the antenna 241 of the display mechanism 200 and the IC card reader becomes short.

In the case, regardless that the user tries to perform communication with the image forming apparatus 1 by, for example, holding the mobile terminal over the IC card reader, communication may occur between the antenna on the side of the display mechanism 200 and the mobile terminal.

More specifically, there is a case where both the antenna 241 of the display mechanism 200 and the antenna provided in the IC card reader are turned on regardless of a state of the display mechanism 200.

In this case, in a case where the alienation distance between the antenna 241 of the display mechanism 200 and the antenna of the IC card reader is short, regardless that the user holds the mobile terminal over the one-side antenna, communication may occur between another side antenna and the mobile terminal.

In contrast, similar to the embodiment, in a case where the antenna 241 of the display mechanism 200 is provided on the side opposite to the side which is close to the IC card reader installation place, the alienation distance between the antenna 241 of the display mechanism 200 and the antenna of the IC card reader becomes long. Therefore, there is a high possibility that communication is performed between the antenna, which is scheduled to perform communication, and the mobile terminal.

Figure 4:
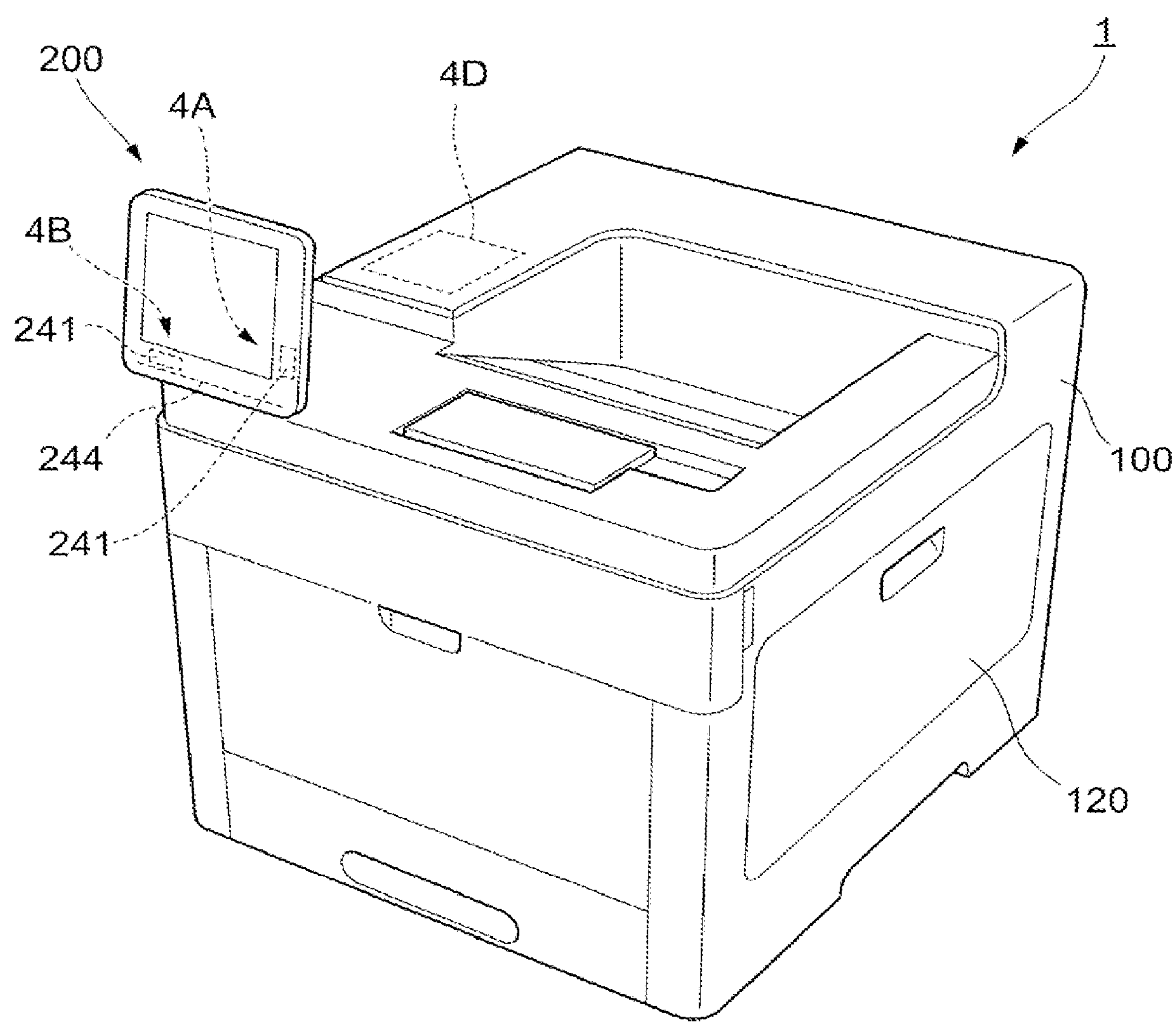
FIG. 4 is a diagram illustrating an example of another configuration of the image forming apparatus.
Figure 5:
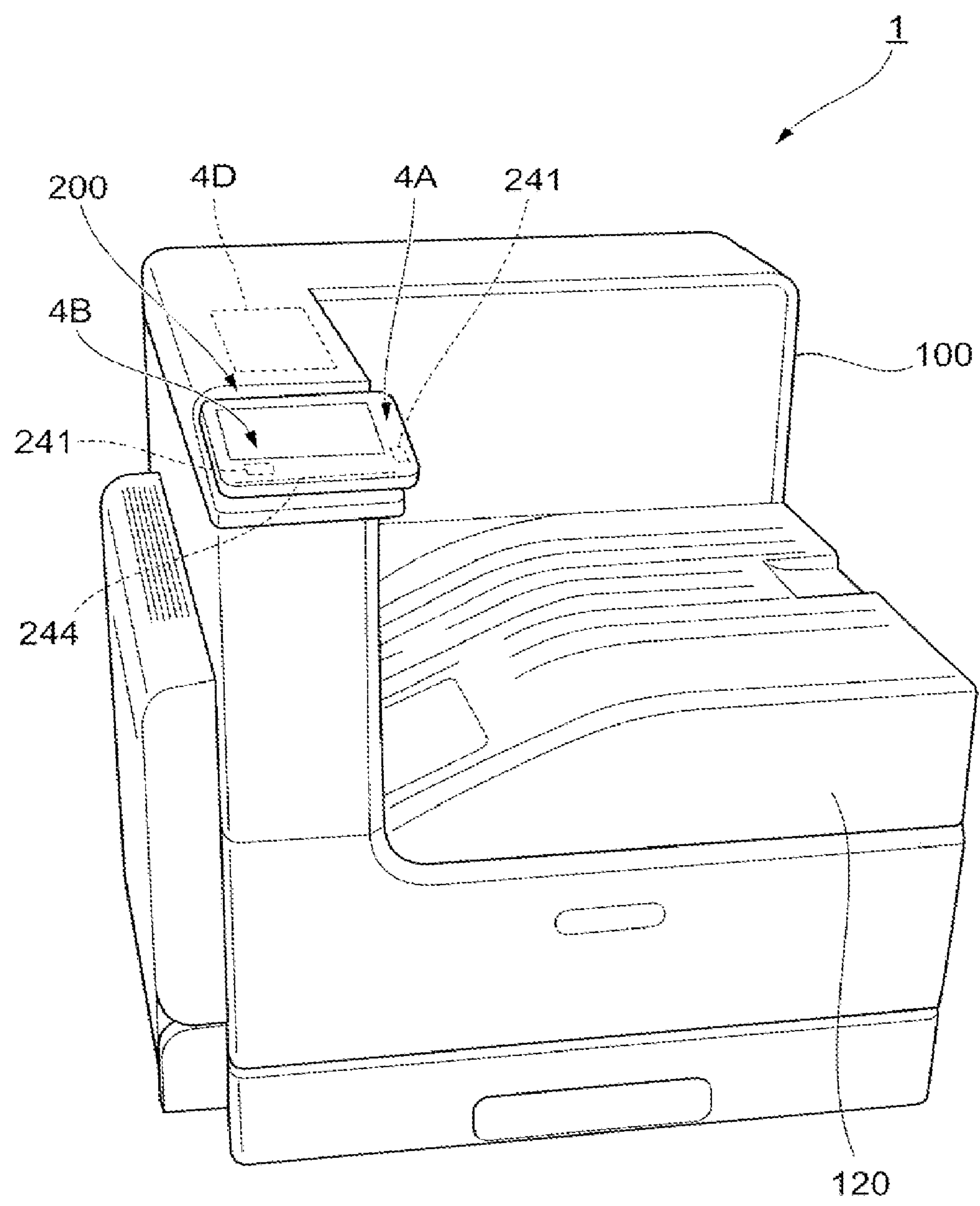
FIG. 5 is a diagram illustrating an example of another configuration of the image forming apparatus.

FIGS. 4 and 5 are diagrams illustrating examples of other configurations of the image forming apparatus 1.

In the image forming apparatus 1, the image reading mechanism 110 illustrated in FIG. 1 is not provided, and only the image forming mechanism 120 is provided. Furthermore, in the image forming apparatus 1, the display mechanism 200 rotates around the rotational shaft 244.

Furthermore, in addition, the antenna 241 is provided in the display mechanism 200, as indicated by reference symbol 4A, similar to the above description. The antenna 241 is provided on a side of the rotational shaft 244. In addition, the antenna 241 is provided on the right side of the display mechanism 200 in the drawing.

Meanwhile, an installation location of the antenna 241 is not limited to the right side of the display mechanism 200, and may be provided on a lower side of the display mechanism 200 as indicated by reference symbol 4B. In addition, the antenna 241 may be installed on an upper side and a left side of the display mechanism 200.

In addition, in the configuration example illustrated in FIGS. 4 and 5, it is possible to attach the IC card reader to a place indicated by reference symbol 4D in the drawing. More specifically, it is possible to selectively attach the IC card reader to a back side of the display mechanism 200 such that the IC card reader becomes approximately the same plane as the display mechanism 200.

Although various embodiments have been described above, the embodiments may be combined.

In addition, the present disclosure is not limited to the above-described embodiments, and may be carried out in various forms without departing from the gist of the present disclosure.

REFERENCE SIGNS LIST

1 image forming apparatus
100 apparatus main body
100A front surface
200 display mechanism
211 first side edge
221 display screen
241 antenna
244 rotational shaft
280 control substrate
300 control section
400 connection line

The invention claimed is:

1. An information processing device comprising:
an apparatus main body;
a display mechanism that is provided to be displaceable with respect to the apparatus main body, the display mechanism including a first antenna provided on one side of the display mechanism and used to perform communication with a mobile terminal; and
a second antenna that is different from the first antenna and that is installed in a part of the apparatus main body outside of an edge of an other side of the display mechanism,
wherein a distance between the first antenna and the second antenna is larger than a distance within which the communication between the first antenna and the second antenna is performed.

2. The information processing device according to claim 1,
wherein the first antenna and the second antenna use a same type of communication system for communicating with the mobile terminal.

3. The information processing device according to claim 2,
wherein both of the first antenna and the second antenna are near field communication antennas.

4. The information processing device according to claim 1,
wherein the display mechanism comprises a rotational shaft along a lower side edge of the display mechanism,
the first antenna is closer to the rotational shaft than to an upper side edge of the display mechanism.

5. An information processing device comprising:
an apparatus main body;
a display mechanism that is provided to be displaceable with respect to the apparatus main body, the display mechanism including a first antenna provided on one side of the display mechanism and used to perform communication with a mobile terminal; and
a second antenna that is different from the first antenna and that is installed in a part of the apparatus main body outside of an edge of an other side of the display mechanism,
wherein the other side of the display mechanism is an opposite side from the one side of the display mechanism.

* * * * *